(12) United States Patent
Frantzeskakis et al.

(10) Patent No.: US 9,712,317 B2
(45) Date of Patent: Jul. 18, 2017

(54) CARRIER SYNCHRONIZATION APPROPRIATE FOR ALM NFC DATA TRANSMISSION

(71) Applicant: Avago Technologies General IP (Singapore) Pte. Ltd., Singapore (SG)

(72) Inventors: Manolis Frantzeskakis, Ilioupolis (GR); Dong-U Lee, Irvine, CA (US); Divyanshu Jain, Costa Mesa, CA (US); Jianhua Gan, Irvine, CA (US); Shengyang Xu, Irvine, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/918,284

(22) Filed: Oct. 20, 2015

(65) Prior Publication Data
US 2016/0241384 A1    Aug. 18, 2016

Related U.S. Application Data

(60) Provisional application No. 62/117,184, filed on Feb. 17, 2015.

(51) Int. Cl.
*H03D 3/24* (2006.01)
*H04L 7/02* (2006.01)
*H04B 5/00* (2006.01)
*H04L 27/00* (2006.01)

(52) U.S. Cl.
CPC ............ *H04L 7/02* (2013.01); *H04B 5/0031* (2013.01); *H04L 27/0014* (2013.01); *H04L 2027/0026* (2013.01); *H04L 2027/0055* (2013.01); *H04L 2027/0067* (2013.01)

(58) Field of Classification Search
CPC .. H04L 7/02; H04L 2027/0026; H04B 5/0031; H04B 15/04; H04B 1/0475; H04H 60/29; H03L 7/087; H03L 7/107; H03L 7/189
USPC ................. 375/326, 327, 373–376; 327/141; 331/17
See application file for complete search history.

(56) References Cited

U.S. PATENT DOCUMENTS

| | | | | |
|---|---|---|---|---|
| 5,151,665 A | * | 9/1992 | Wentzler | ................. H03L 7/107 331/17 |
| 5,671,257 A | * | 9/1997 | Cochran | ................. H03L 7/087 327/141 |

(Continued)

*Primary Examiner* — Phuong Phu
(74) *Attorney, Agent, or Firm* — Foley & Lardner LLP

(57) ABSTRACT

In some aspects, the disclosure is directed to methods and systems for carrier synchronization in active load modulation for near field communications. A broadcast carrier is received from a remote device and mixed with a locally-generated carrier and modulated data. A carrier synchronization circuit synchronizes the locally-generated carrier with the broadcast carrier based on an identified phase error from a double Cartesian-to-polar mapping of the mixed locally-generated carrier and broadcast carrier. In some implementations, the system also includes a modulation suppression circuit for providing unmodulated carrier signals to the carrier synchronization circuit or suppressing modulation distortion to maintain frequency and phase tracking despite the presence of data.

20 Claims, 15 Drawing Sheets
(4 of 15 Drawing Sheet(s) Filed in Color)

(56) References Cited

U.S. PATENT DOCUMENTS

| | | | | |
|---|---|---|---|---|
| 6,836,192 B1* | 12/2004 | Yang | ................ | H03L 7/189 |
| | | | | 331/117 R |
| 2001/0040932 A1* | 11/2001 | Lindquist | ............ | H04B 15/04 |
| | | | | 375/346 |
| 2011/0051844 A1* | 3/2011 | Rofougaran | ......... | H04B 1/0475 |
| | | | | 375/298 |

* cited by examiner

CARRIER SYNCHRONIZATION APPROPRIATE FOR ALM NFC DATA TRANSMISSION

RELATED APPLICATIONS

This application claims priority to and the benefit of U.S. Provisional Application No. 62/117,184, entitled "Carrier Synchronization Appropriate for ALM NFC Data Transmission," filed Feb. 17, 2015, the entirety of which is hereby incorporated by reference for all purposes.

FIELD OF THE DISCLOSURE

This disclosure generally relates to systems and methods for synchronization of local and remote carrier signals for active load modulation in data transmission.

BACKGROUND OF THE DISCLOSURE

In near field communications (NFC) systems, active beacons, unlike passive beacons, communicate with a reader via active load modulation (ALM), allowing significant increase in range and/or reduction in antenna seize. The beacon and reader carriers may be synchronized to avoid read errors at the NFC reader, and particularly to maintain compatibility with older amplitude modulation-only detecting readers, rather than new readers than can also detect phase differences. The signal that is observed at the beacon is an aggregate of the local carrier and reader-broadcast carrier, resulting in an offset that interferes with synchronization of the carrier frequency and phase.

BRIEF DESCRIPTION OF THE DRAWINGS

The patent or application file contains at least one drawing executed in color. Copies of this patent or patent application publication with color drawings will be provided by the Office upon request and payment of the necessary fee.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The ISO/IEC NFC standards (e.g. ISO/IEC 18092 and 21481) are hereby incorporated herein by reference in their entirety and are made part of the present disclosure for all purposes. Although this disclosure may reference aspects of these standard(s), the disclosure is in no way limited by these standard(s).

Figure 1A:
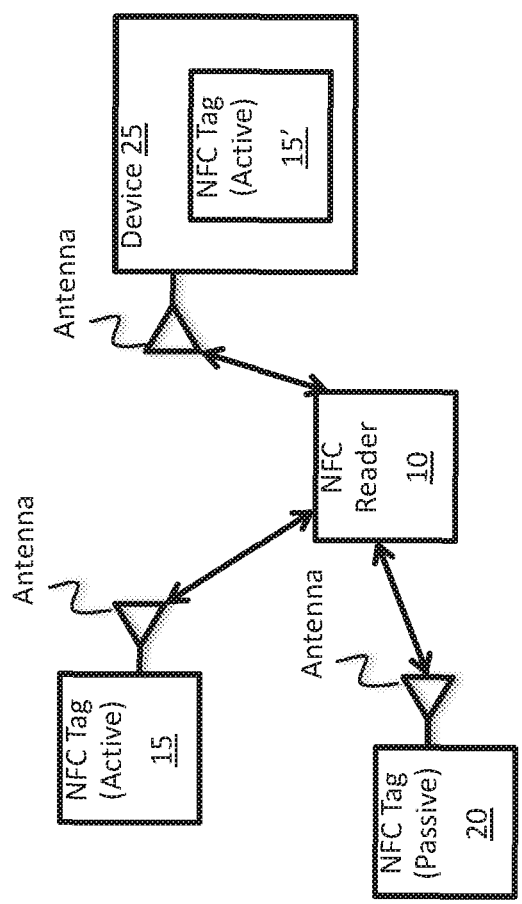
FIG. 1A is a block diagram depicting a network environment useful in connection with the methods and systems described herein.

FIG. 1A is a block diagram depicting a network environment useful in connection with the methods and systems described herein. A first device including an NFC reader 10, such as a kiosk, docking station, tablet, smartphone, pay terminal, or other device, may communicate with one or more passive NFC tags 20, one or more active NFC tags 15, and/or one or more devices 25 including active NFC tags 15', such as other smartphones, tablets, security tags, or any other such devices. In typical practice, passive NFC tags may need to be within centimeters of an NFC reader 10 to be properly read, as the communication involves electromagnetic induction between a powered antenna of the NFC reader 10 and an unpowered antenna of the NFC tag 20.

By contrast, the ALM technique used in active tags 15 may allow a dramatic increase of the communication distance in NFC communications, potentially up to several meters. In one implementation, ALM involves the generation and transmission of a tag-modulated waveform by modulating the carrier frequency with a modulated subcarrier. In many implementations, the active tag may not need to reproduce the carrier frequency, allowing efficient user of power. Furthermore, if frequency and phase synchronization is maintained between the active tag and reader, the resulting signal received by the reader may be indistinguishable from that received by a closer passive tag, providing both active-tag and passive-tag compatibility without modification of the reader. Accordingly, frequency and phase locking to the reader carrier is important for the NFC communication link, especially in instances where the reader employs an amplitude based detector. Carrier tracking in the presence of ALM data is a particularly challenging problem since the communicating devices (reader and tag) are transmitting their signals simultaneously. The signal observed at the tag is an aggregate carrier instead of a plain reader carrier, while the tag transmitted data are perceived as an intensive distortion by the locking mechanism attempting to lock on the obscured reader carrier.

In some implementations, an active tag may incorporate a crystal for good frequency/phase locking performance. In other implementations discussed herein, the active tag may not include a crystal, and instead may control a voltage-controlled carrier generating oscillator via a charge pump or coarse and/or fine capacitors. The ability to lock to a carrier without utilizing a crystal allows use of the tag in low-power modes (e.g. when the device including the tag is turned off). In one implementation, an active tag may include a digital frequency locked-loop (DFLL) for locking to a desired frequency quickly (e.g. within milliseconds or faster), as well as a digital phase locked-loop (DPLL) allowing fine phase alignment and maintenance of constant phase with lossy phase integrators.

In one implementation, the present disclosure is directed to a system for carrier synchronization in near field communications. The system includes a first circuit configured to convert a first pair of signals representing Cartesian coordinates of an aggregated near field communication signal comprising a broadcast carrier from a remote device and a locally-generated carrier into a second pair of signals representing polar coordinates of the aggregated near field communication signal. The system includes a second circuit configured to identify and remove an offset from each of the second pair of signals to generate a third pair of signals; and a third circuit configured to convert the third pair of signals from a Cartesian to polar representation and provide an output phase angle to a frequency adjustment circuit of a local carrier generator.

In some implementations, the system includes the frequency adjustment circuit configured to adjust a frequency of the local carrier generator into synchronization with the broadcast carrier from the remote device. In one such implementation, the frequency adjustment circuit includes a charge pump. In another such implementation, the frequency adjustment circuit includes an array of dynamically switchable capacitors. In yet another such implementation, the dynamically switchable capacitors have binary coded values. In still another such implementation, the dynamically switchable capacitors have unary coded values.

In some implementations of the system, the second circuit is configured to identify and remove the offset responsive to detection of a pause in transmission of modulated data by the system. In other implementations, the second circuit is configured to subtract an average amplitude $r_{ave}$ of the second signals from the second signals to generate an envelope of the third pair of signals. In still another implementation, the system includes a selector providing one of either of the output of the second circuit or the output of the third circuit to the frequency adjustment circuit, responsive to detection of presence or absence of modulated data, respectively. In another implementation, the first circuit further includes a decimator. In yet another implementation, the system includes a direct digital frequency synthesizer (DDFS) receiving the output of the second circuit, the DDFS configured to generate a phase correction signal.

In still another aspect, the present disclosure is directed to a method for carrier synchronization in near field communications. The method includes receiving, by a first circuit of a first device, a near field communication signal comprising an aggregated broadcast carrier from a second device and a locally-generated carrier from the first device. The method also includes converting, by a second circuit of the first device, a Cartesian representation of the aggregated broadcast carrier to a polar representation. The method further includes removing, by a third circuit of the first device, an offset from the polar representation of the aggregated broadcast carrier to generate an intermediate signal. The method also includes converting, by a fourth circuit of the first device, a Cartesian representation of the intermediate signal into a polar representation. The method also includes controlling a local carrier generator, by the first device, with an output phase signal from the fourth circuit.

In one implementation, the method includes identifying an absence of modulation of the locally-generated carrier with data. In a further implementation, converting the Cartesian representation of the aggregated broadcast carrier to a polar representation is performed responsive to identifying the absence of modulation. In another implementation, identifying the absence of modulation of the local-generated carrier includes identifying a modulation pause between packets. In yet another implementation, converting the Cartesian representation of the aggregated broadcast carrier to the polar representation includes performing a coordinate rotation digital computer (CORDIC) calculation. In still another implementation, removing the offset from the polar representation of the aggregated broadcast carrier to generate the intermediate signal includes subtracting an average amplitude of the aggregated broadcast carrier from the aggregated broadcast carrier. In yet still another implementation, removing the offset from the polar representation of the aggregated broadcast carrier to generate the intermediate signal includes multiplying an average amplitude of the aggregated broadcast carrier by a sampled phase of the aggregated broadcast carrier.

In still another aspect, the present disclosure is directed to a system for carrier synchronization in near field communications. The system includes an antenna for receiving a broadcast carrier from a remote device and transmitting a locally-generated carrier and modulated data. The system also includes a carrier synchronization circuit for synchronizing the locally-generated carrier and broadcast carrier based on an identified phase error from a double Cartesian-to-polar mapping of the mixed locally-generated carrier and broadcast carrier. In some implementations, the system also includes a modulation suppression circuit for providing unmodulated carrier signals to the carrier synchronization circuit.

Figure 1B:
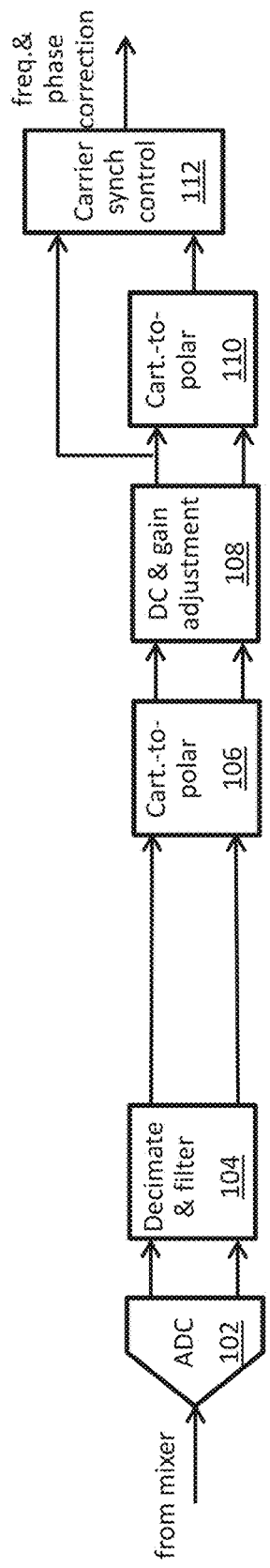
FIG. 1B is a block diagram depicting an implementation of a circuit for carrier synchronization.

FIG. 1B is a block diagram depicting an implementation of a circuit for carrier synchronization, in which the beacon has its own internal crystal with its own timing. The aggregated signal may be received from a mixer of the tag and converted to a digital signal via analog to digital converter (ADC) 102. After decimating and filtering the aggregated carrier signal at block 104 to remove noise, the signal may be converted from an in-phase (I) and quadrature (Q) Cartesian domain to a polar domain (r/γ) by converter 106. This gives a representation of the signal with a DC offset that can be removed by filters 108 to recenter the signal. Once recentered, the signal may again be converted from a Cartesian representation to polar coordinates at converter 110 (which may, in some implementations, perform a frequency CORDIC algorithm to compute phase of I/Q samples) allowing measurement of Δϕ/t or frequency. The measured frequency and amplitude may be input to a DFLL and/or DPLL at module 112 to provide frequency and phase correction signals for shifting and synchronizing a crystal-generated carrier.

Figure 1C:
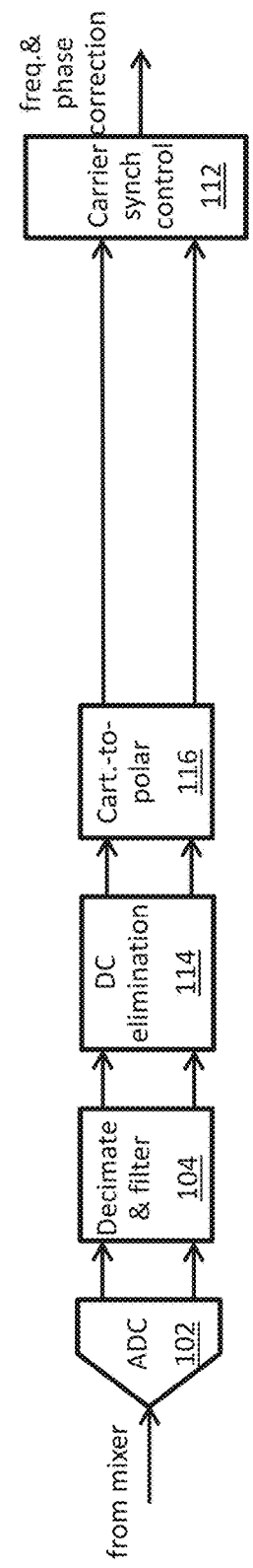
FIG. 1C is a block diagram depicting another implementation of a circuit for carrier synchronization.

FIG. 1C is a block diagram depicting another implementation of a circuit for carrier synchronization. Similar to the implementation illustrated in FIG. 1B, the aggregated signal may be received from a mixer of the tag and converted to a digital signal via ADC 102, and decimated and filtered at block 104. In implementations in which the tag does not include a crystal and the local carrier is generated by a VCO or digital controlled oscillator (DCO) or similar circuit, the first Cartesian to polar conversion step 106 may be eliminated and the DC offset may be removed at filter block 114, allowing use of only a single Cartesian to polar conversion at block 116. This may be used in implementations in which the DC offset is known.

Figure 1D:
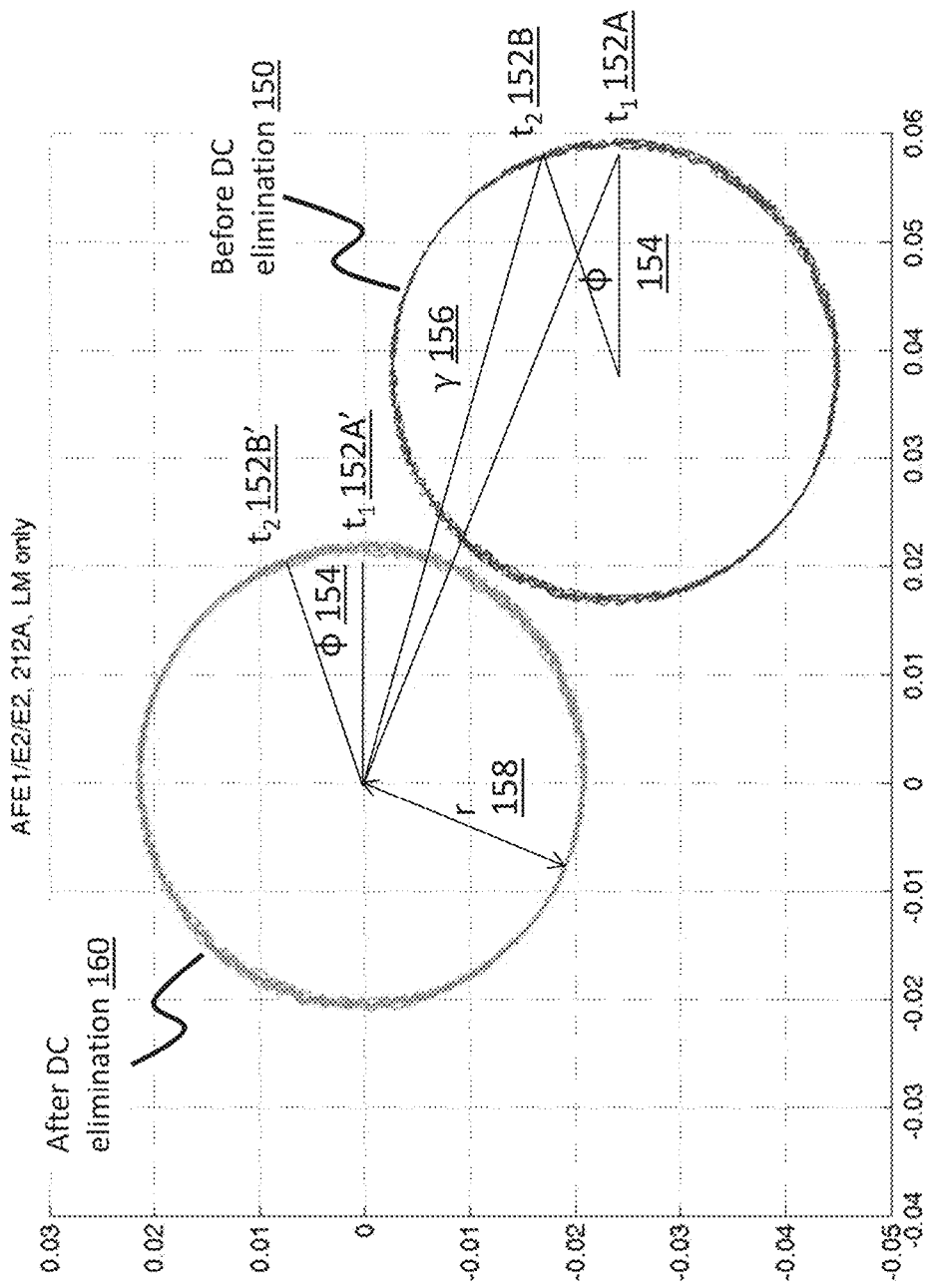
FIG. 1D is a diagram of an implementation of carrier tracking and direct current (DC) offset removal.

FIG. 1D is a diagram of an implementation of carrier tracking and direct current (DC) offset removal. As shown, before DC elimination, an aggregated carrier signal may be measured at $t_1$ 152A and $t_2$ 152B in a Cartesian domain representation. The contribution of the reader signal $s\downarrow 1 = \exp j\omega t$ is aggregated with the tag contribution $s\downarrow 2 = r \exp j(\omega t + \Delta\omega t)$ to equal the combined signal $D(t) = LPF\{s\downarrow 1 + s\downarrow 2\}e\uparrow -j(\omega t + \Delta\omega t)$, appearing as a circle (illustrated in blue, to the lower right) at reference 150. Given r as the amplitude of the locally-generated waveform, $\gamma$ 156 is the magnitude of the aggregated signal. After elimination of the DC offset, the CORDIC may determine the phase value $\Phi$ 154, allowing direct measurement of frequency of the carrier signal via $(t_2-t_1)/\Phi$.

Figure 2A:
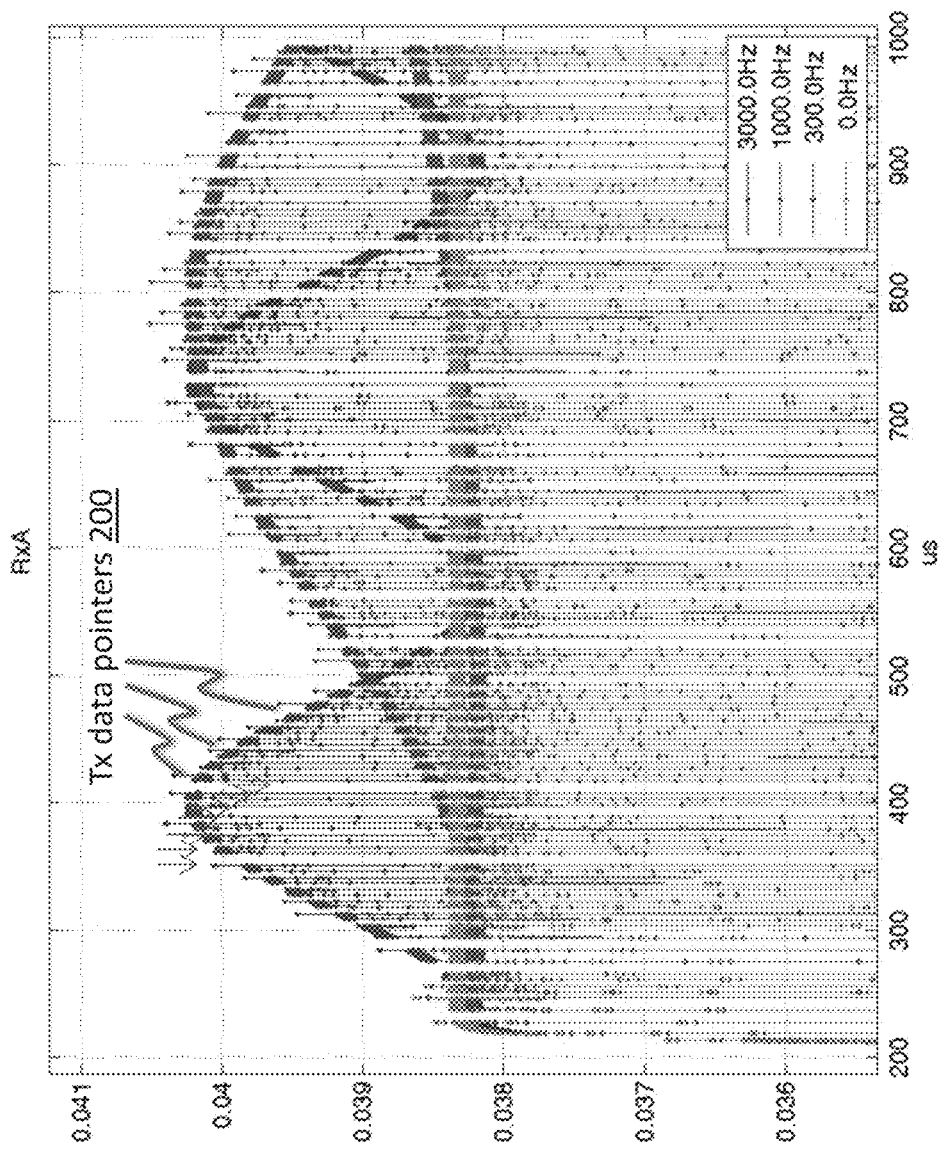
FIG. 2A is a chart of signal amplitudes of transmitted ALM packets at different frequency errors, according to one implementation.
Figure 2B:
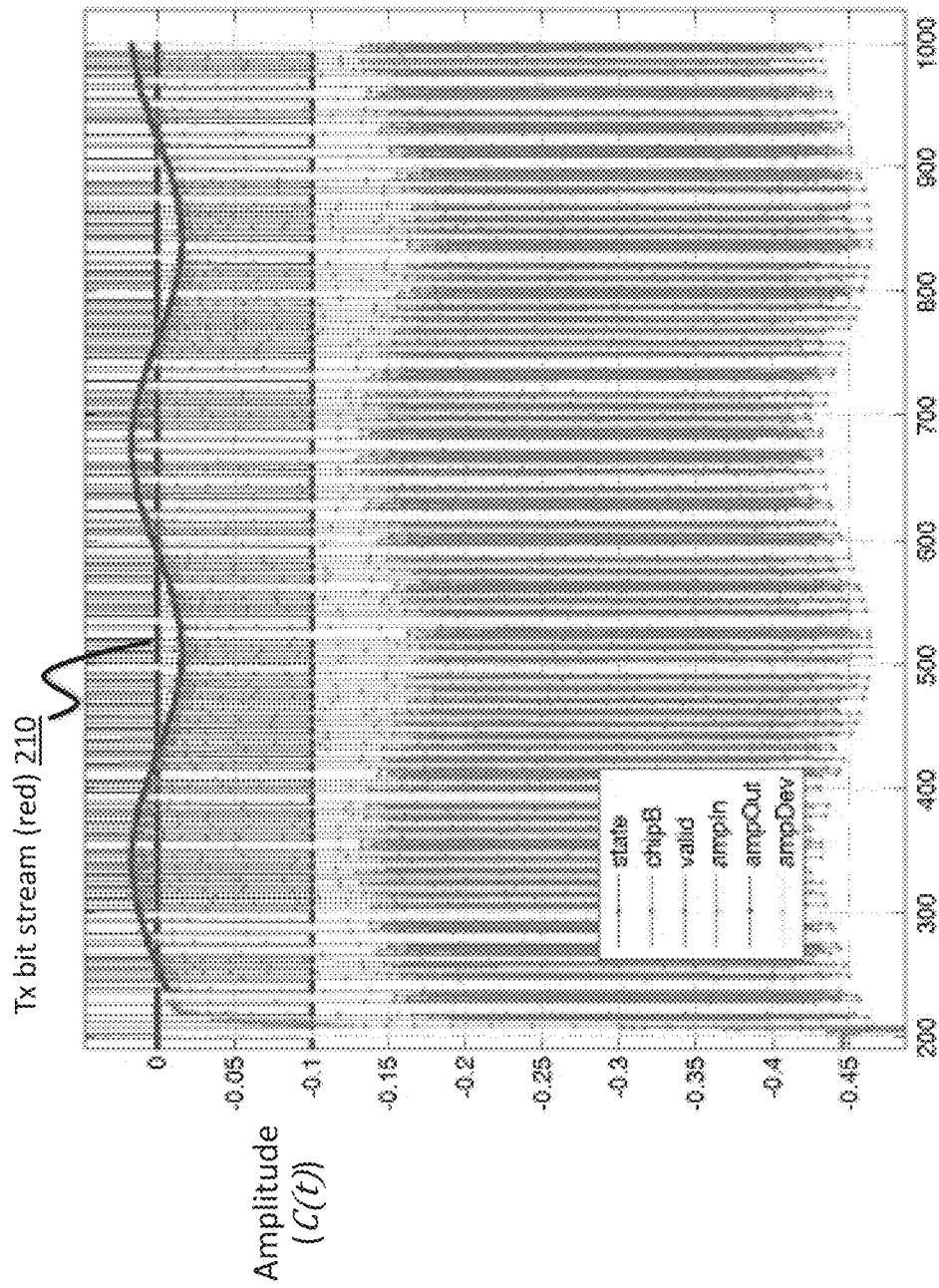
FIG. 2B is a chart of an extracted bit stream and carrier amplitude, according to one implementation.
Figure 2C:
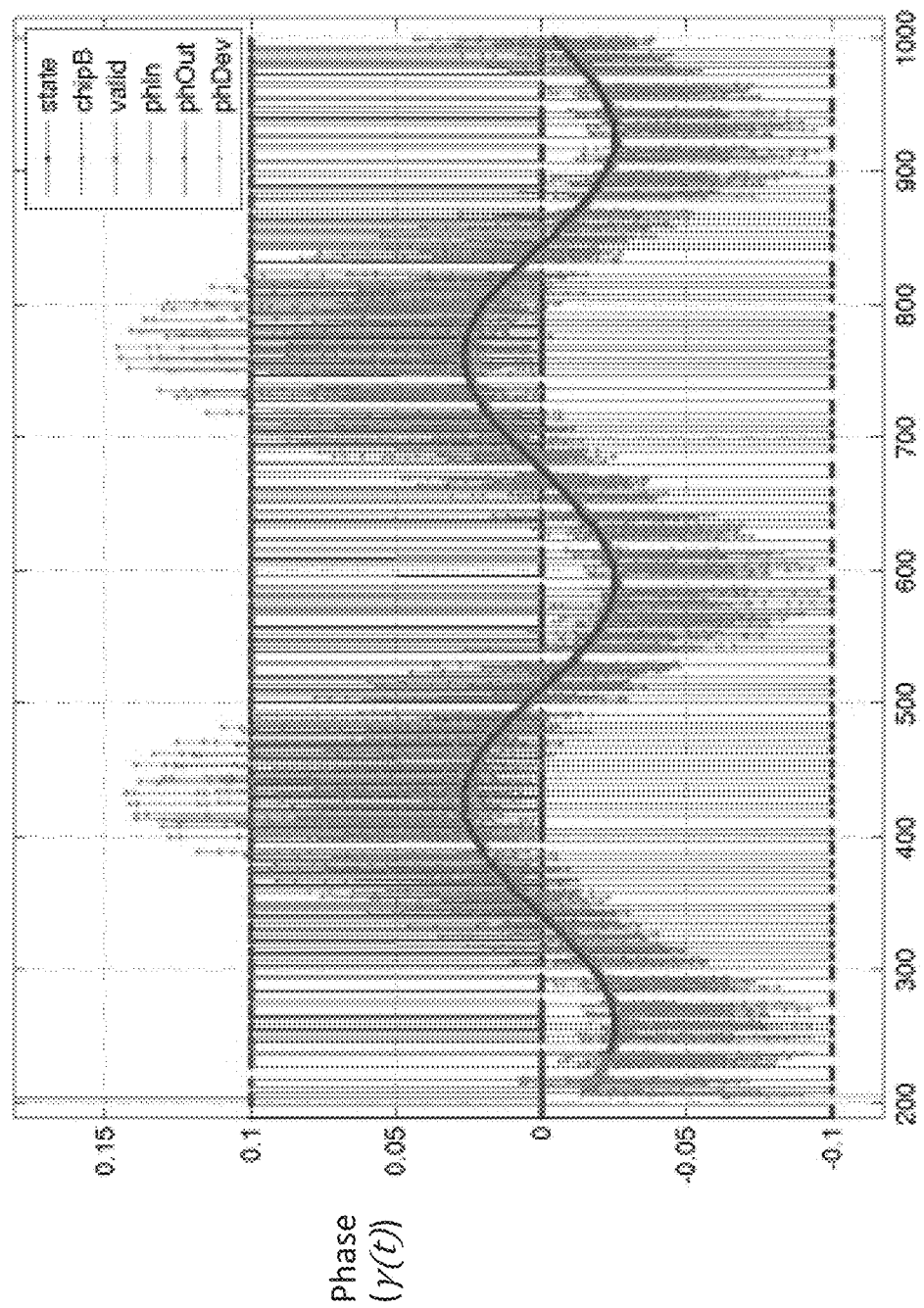
FIG. 2C is a chart of an extracted bitstream and phase, according to one implementation.

During transmission of ALM packets, the observed amplitude is shaped by the transmitted data. Feature based logic may be used to suppress the modulation distortion, allowing recovery of the aggregated carrier signal. FIG. 2A is a chart of signal amplitudes of transmitted ALM packets at different frequency errors, according to one implementation. Some examples of transmission data pointers 200 are identified for clarity. Locally generated data, such as Manchester-encoded data, may be used to identify the portion of the signal showing sinusoidal behavior that may be captured for carrier tracking and offset removal, as per FIG. 1D above. The produced samples may be referred to as valid samples in one implementation, and may be averaged or smoothed to increase accuracy of frequency and phase detection. FIG. 2B is a chart of an extracted bit stream 210 and carrier amplitude, according to one such implementation using feature based logic and a priori knowledge of transmitted data. The amplitude $C(t) = r + \cos \Delta\omega t$ for implementations in which r, the amplitude of the locally generated signal, is significantly larger than the amplitude of the received signal from the reader. The magnitude of $\gamma$ is given by $1/r \sin \Delta\omega t$. Similarly, using valid samples, phase can be measured as shown in the chart of FIG. 2C.

Figure 3A:
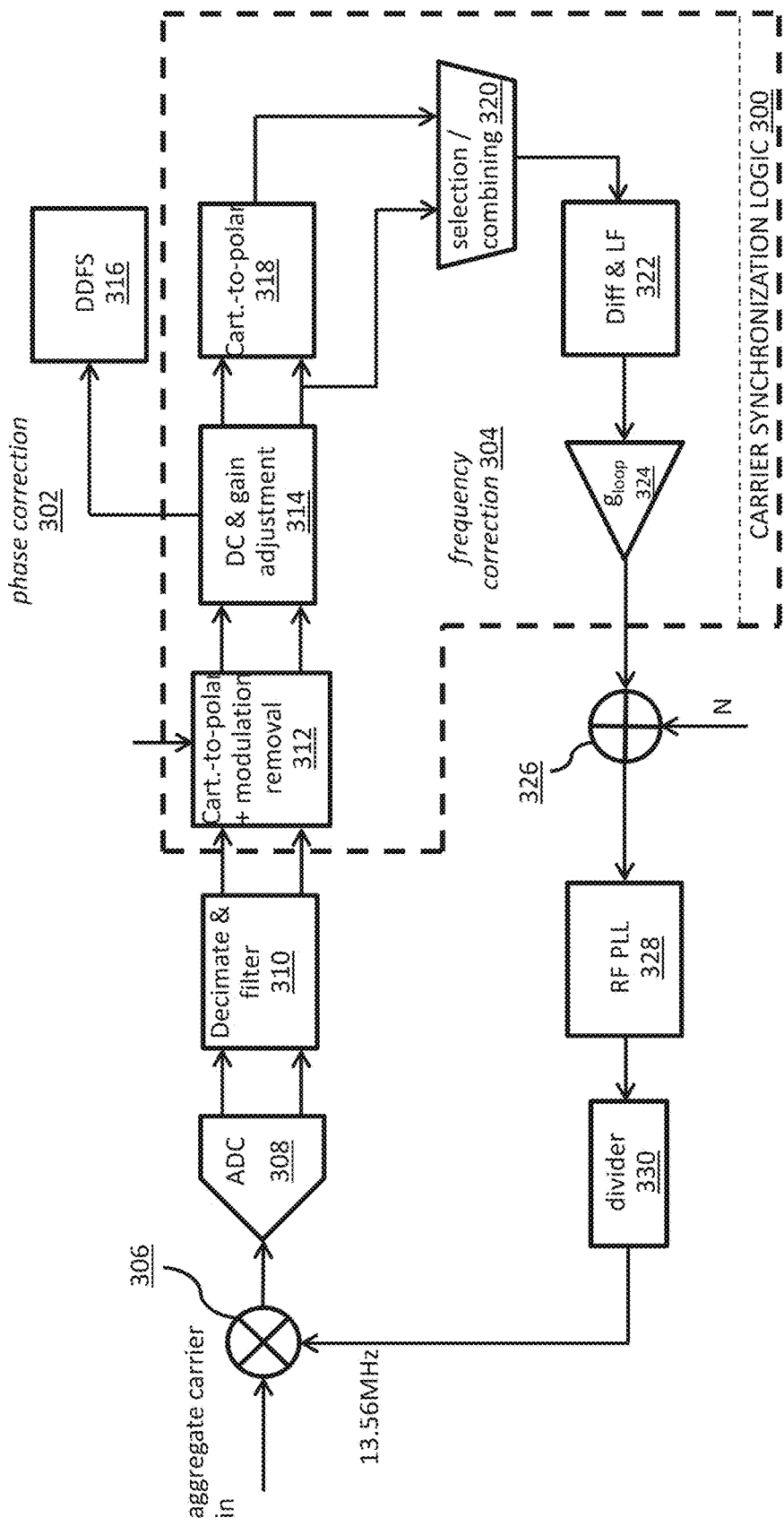
FIG. 3A is a block diagram of an implementation of a circuit for carrier synchronization.

FIG. 3A is a block diagram of an implementation of a circuit for carrier synchronization 300, providing frequency correction 304, with phase correction 302 provided by a separate direct digital frequency synthesizer (DDFS) 316. Circuit 300 may be provided via a reconfigurable processor (microprocessor, FPGA, etc.) configured via software, or may be configured out of hardware components. An aggregated carrier may be mixed with a locally generated carrier signal (via RF phase lock loop 328 and frequency divider 330) at an antenna or amplifier. The aggregated signal may be converted to digital via an ADC 308, which samples and converts the signal into I and Q Cartesian representations. The signal is decimated and low pass filtered at step 310 to remove noise and improve detection accuracy. As discussed above, using feature based logic to detect and remove locally-generated modulation data (e.g. Tx bit), at block 312, a CORDIC or similar algorithm may be used to convert the I/Q representation into an $\alpha/\Phi$ polar representation. As discussed above, the resulting aggregated carrier may be measured as a sinusoid around an offset center, which may be removed by DC & gain adjustment controller 314.

At DC and gain adjustment controller 314, the sampled amplitude of the input signal $r_{in}(n) = C(nT)$, where T is the sampling period of ADC 308. Similarly, the sampled phase, $\gamma_{in}(n) = \gamma(nT)$. Over some time interval, the average $r_{aver}$ of the input signal amplitude may be determined (e.g. at the beginning of the packet before the ALM data transmission, or during the transmission of the ALM packet using the valid samples, as discussed above). As the valid samples represent a circle around the DC offset value, the resulting envelope $r_{out}(n) = r_{in}(n) - r_{aver}$ and $\gamma_{out}(n) = \gamma_{in}(n) * r_{aver}$.

At converter 318, the signal may again be converted from a Cartesian to polar domain, as discussed above. With the DC offset removed, the adjusted signal is centered around the origin. The change in phase of this signal may be measured to determine frequency of the received reader carrier. Depending on whether local modulation of the carrier is being performed, selector 320 may select the output of converter 318 or DC and gain adjustment 314. This allows maintenance of frequency lock during modulation by preventing the circuit from attempting to detect and lock on to the distortion caused by local data modulation. At 322, the selected signal may be filtered to provide a frequency correction signal to fine tune the local clock. The filtered signal may be further amplified at element 324. The amplified signal may be summed with the correction signal with the reference frequency at adder 326 and tuning the local carrier to a multiple of the received carrier by RF PLL 328. The output $N*f_{ref}$ may be divided by frequency divider 330, and finally re-mixed at the antenna.

Figure 3B:
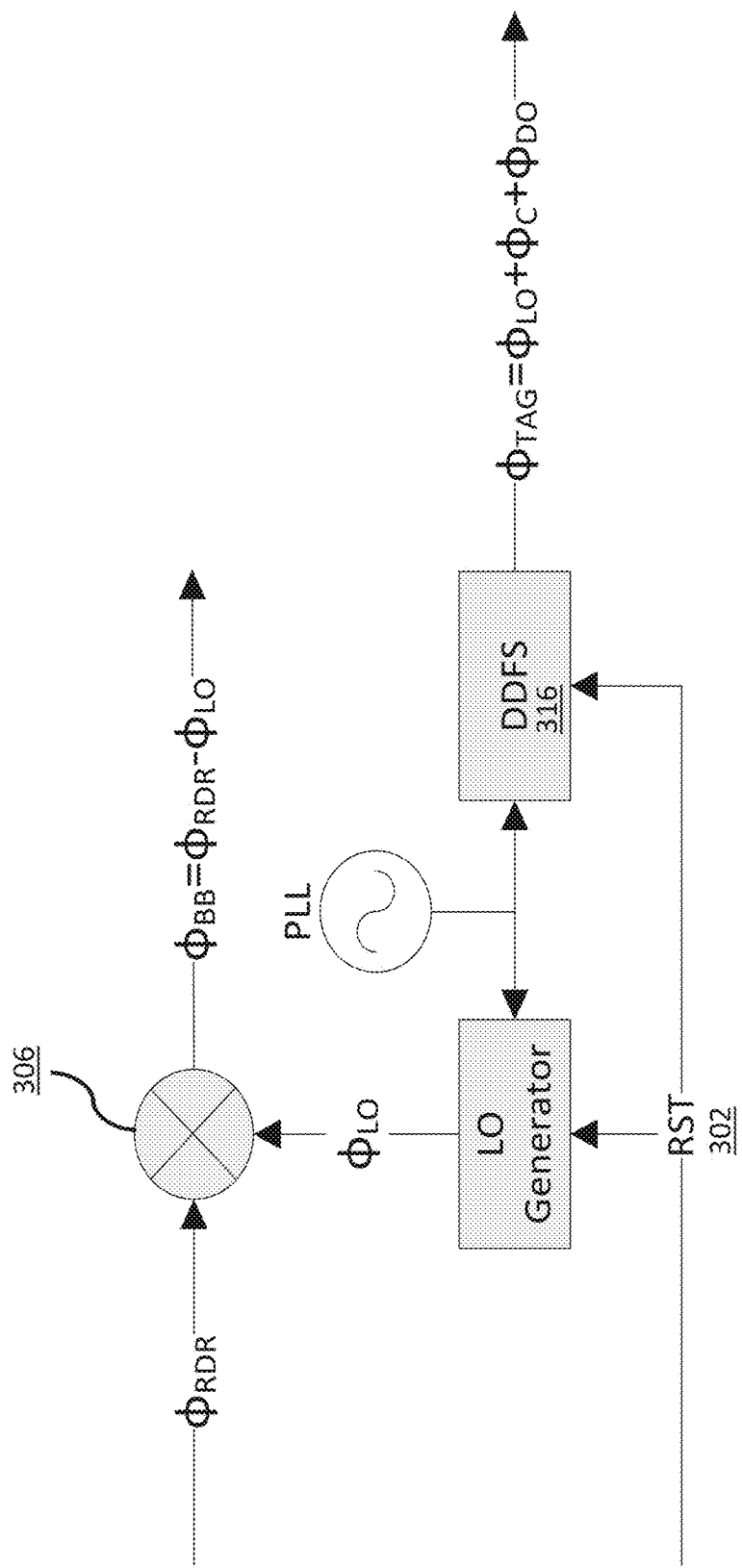
FIG. 3B is a block diagram of an implementation of a circuit for phase synchronization.

FIG. 3B illustrates an implementation of a circuit for phase synchronization, as with DDFS 316 of FIG. 3A. In some implementations, this may allow phase synchronization in a nonintrusive method without a requirement to transmit an artificial carrier, which may incur additional latency. In one implementation, the received carrier signal phase may be read at a time just before the active tag begins transmitting an ALM packet (e.g. when the transmission amplifier turns on, or in response to detecting an ImActive signal or trigger). The circuit may wait a few microseconds for the amplifier to settle, and may read the CORDIC phase (e.g. signal 302 from synchronization logic 300). The CORDIC phase may be transformed to a DDFS phase via shifts to one of a plurality of predetermined phase ticks for the DDFS. For example, in one implementation, the phase may be calculated as:

```
csfOutPhase = ([CORDIC phase (most significant bits)] << 8) |
              [CORDIC phase (least significant bits)];
    ddfsPhase = (csfOutPhase + (csfOutPhase << 1)) >> 9;
    ddfsPhase = ddfsPhase + offset;
        if (ddfsPhase >= 24)
        {
          ddfsPhase = ddfsPhase - 24;
        }
```

As shown in FIG. 3B and as discussed above in connection with FIG. 3A, φLO or the phase of the local oscillator may be subtracted from φRDR or the phase of the reader carrier signal to result in the baseband phase φBB. The active tag phase or φTAG may be determined by the DDFS as φLO plus a constant phase offset between the mixer and DDFS or φC, plus a configurable phase offset φDO. To synchronize the reader carrier phase φRDR with the active tag phase φTAG, an offset φΔ is added. This offset may be determined by substituting the baseband phase φBB into the tag phase expression above, or φTAG=φRDR−φBB+φC+φDO. The reader carrier phase may be replaced with the tag phase plus the offset, or φTAG=φTAG+φΔ−φBB+φC+φDO, or φDO=φBB−φC−φΔ. φDO may then be set accordingly to the sum of the measured received baseband phase and a desired phase offset between the mixer and DDFS output.

In some implementations, phase error may be determined through an accumulated approach based on measured frequency errors. Specifically, in one such implementation, given a positive or negative phase error θ(n2T)−θ(n1T) during the period of ΔT, if the phase error is greater than 0, the frequency of the carrier generated by the active tag may be increased; and if the phase error is less than 0, the frequency of the carrier generated by the active tag may be decreased. For every ΔT period, the accumulated phase error may be equal to Δθa(nΔT)=Δθ(nΔT)+Δθ(nΔT−T)+Δθ(nΔT−2T)++Δθ((n−1)ΔT), where ΔT is multiple of T. In another implementation, two consecutive samples, θ(nT) and θ((n−1)T) may be used to determine phase error, although this may be difficult if the frequency error Δf is too small. In another implementation, the starting and end phase errors Δθ(n1T) and Δθ(n2T) during a period of ΔT=(n2−n1)T may be used to measure the phase error.

Figure 3C:
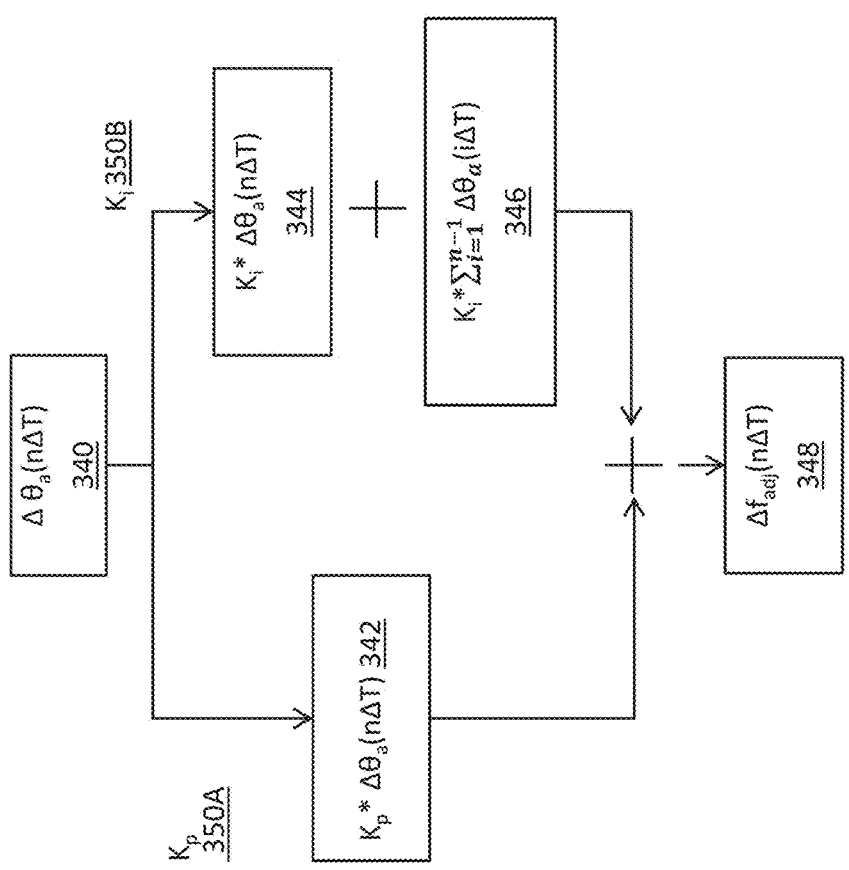
FIG. 3C is a block diagram of a proportional-integral algorithm for frequency adjustment, according to one implementation.

FIG. 3C is a block diagram of a proportional-integral algorithm for frequency adjustment 342 $\Delta f_{adj}(n\Delta T)$ at time nΔT, according to one implementation. Given a proportional gain 344A $K_p$ that reflects the instantaneous accumulated phase error, and an integral gain 344B $K_i$ that responds to the accumulation of instantaneous errors over time, the frequency adjustment 342 may be expressed as $\Delta f_{adj}(n\Delta T) = K_p * \Delta \theta_a(n\Delta T) + K_i * \Sigma_{i=1}^{n} \Delta \theta_a(i\Delta T)$. $\Delta f_{adj}(n\Delta T)$ may be added to the current tag frequency to obtain the adjusted frequency $f_T(n\Delta T) = f_T((n-1)\Delta T) + \Delta f_{adj}(n\Delta T)$.

As discussed above, in some implementations, a DCO may be used as a reference for RF PLL 328 in FIG. 3A. In some implementations, the DCO may need to be primed with a control word to generate a known frequency with a reasonable error, because the DCO output error may vary by temperature and frequency. In one such implementation, the active tag may include an all digital frequency locked loop (ADFLL) and a field-clock slicer. At detection of the reader carrier, the tag may put the ADFLL into a closed-loop mode with the field-clock slicer set as its reference. Once the ADFLL is locked, in some implementations, the DCO may produce a frequency equal to approximately twice the reader's carrier frequency. The ADFLL may then be set to open-loop mode by freezing a delta sigma modulator (DSM) input of the ADFLL. Freezing the DSM input may result in a more accurate frequency in some implementations, since the DSM has significantly more precision that of the DCO control word. In other implementations, the ADFLL may be set to open-loop mode by freezing the DCO control word by cutting off the reference input to the ADFLL.

In some implementations, the circuit may measure or track the reader carrier frequency during packets. This allows the circuit to maintain synchronization, even during very long (e.g. 256 byte) packets or if either the tag or reader has an unstable local oscillator. In one implementation, the circuit make make frequency measurements during stable and consistent regions of the packet, such as pauses or valleys of regular subcarrier bursts (RSBs). The system may use pauses or valleys instead of peaks during the subcarrier bursts, because, lacking data, the pauses provide maximum visibility of the reader's carrier (e.g. maximum reader/tag carrier ratio). In many implementations, the pauses may be too narrow for transients of the data burst to settle or for the tag's transmitter to shut off. Accordingly, the pauses may contain an aggregate carrier comprising the reader carrier and tag carrier. However, the tag carrier may regarded as a DC term, because the tag transmitter and receiver share the same clock. This carrier may be canceled out by selecting specific measurement times. In one such implementation, the circuit may measure the reader-only carrier (R) upon detecting an lmActive trigger, prior to the tag carrier being transmitted. The circuit may then measure the aggregate reader-plus-tag carrier (A) at the first valid pause during the RSB. The tag-only carrier may then be estimated as A-R. During subsequent pauses, the tag-only carrier may be subtracted as a DC term, and the phase may be examined for frequency errors as discussed above.

Figure 4:
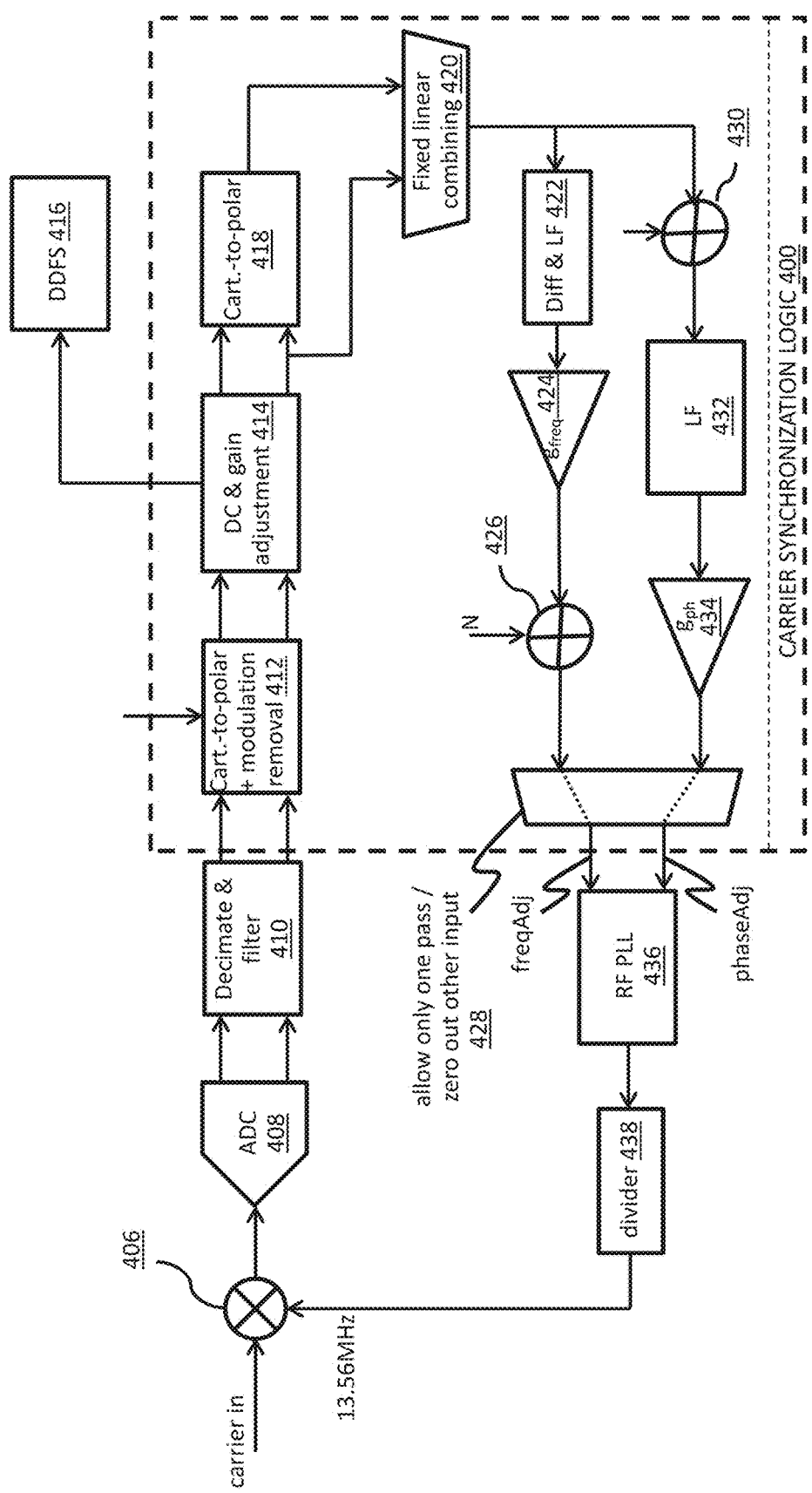
FIG. 4 is a block diagram of another implementation of a circuit for carrier synchronization.

FIG. 4 is a block diagram of another implementation of a circuit 400 for carrier synchronization, providing frequency and phase correction. Similar to the circuit 300 of FIG. 3A, the signals may be processed by elements 406-420 in a similar manner. The output of combiner 420 may be split, with part of the signal processed by filter 422, amplifier 424, and adder 426 similar to 322, 324, and 326 above. A second selector 428 may select the resulting signal for a control input for frequency locking by RF PLL 436, as discussed above.

The output of combiner 420 may also be added at 430 to control input φ, output by DDFS 416. The sum may be filtered at 432 and amplified at 434, similar to 422 and 424, to reduce noise and increase accuracy of phase locking. Selector 428 may select the resulting signal for control input for phase locking by RF PLL 436, such as after the local carrier frequency is matched to the received reader carrier, allowing fine tuning of phase.

In some implementations, RF PLL 328, 436 may include a charge pump controlled by a reference signal, a loop filter, and a VCO outputting a clock signal. The charge pump may be controlled digitally, while the loop filter may be analog, with frequency of the VCO adjusted via variable duty cycles. This may be referred to as a hybrid analog/digital FLL/PLL. In other implementations, a RF PLL 328, 436 may include a bank of dynamically switchable capacitors, and a digital loop filter. This may be referred to as an all-digital FLL/PLL. The capacitors may be deployed in a binary array; a unit element array; or combination of binary and unit element arrays for both coarse and fine control, respectively. One such implementation may include a first array of dynamically switchable capacitors with binary values (e.g. 9 bits), and a second array of dynamically switchable capacitors in unary code at one-quarter resolution of the smallest binary capacitor value (e.g. 16 bits), or any other such values. This may allow switching of the coarse capacitor bank to bring the VCO close to the reader's carrier frequency, and then switching of the fine capacitor bank to maintain synchronization lock during frequency tracking.

Figure 5A:
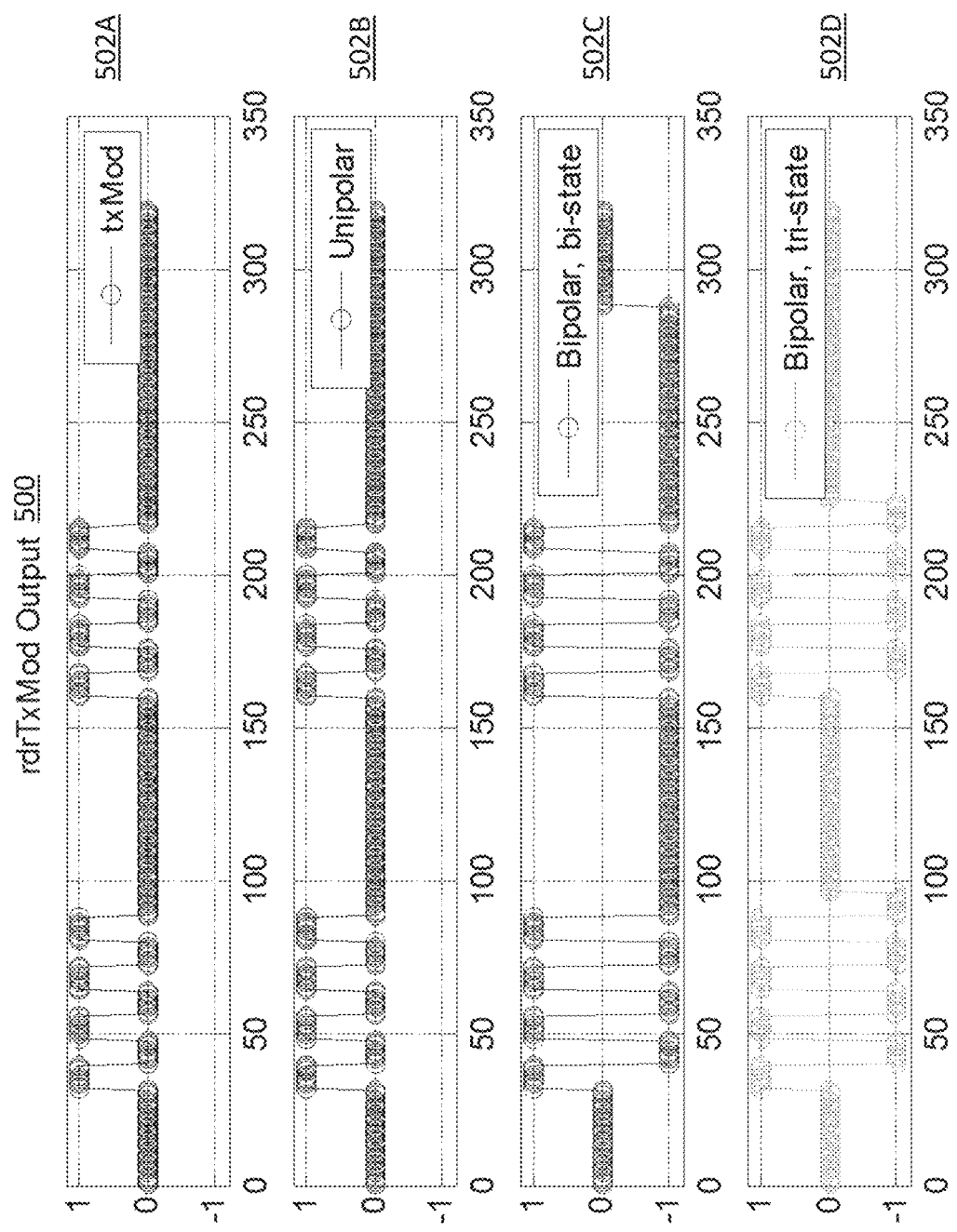
FIGS. 5A-5C are charts comparing unipolar, bipolar, and tri-state bipolar modulation, in various implementations.
Figure 5B:
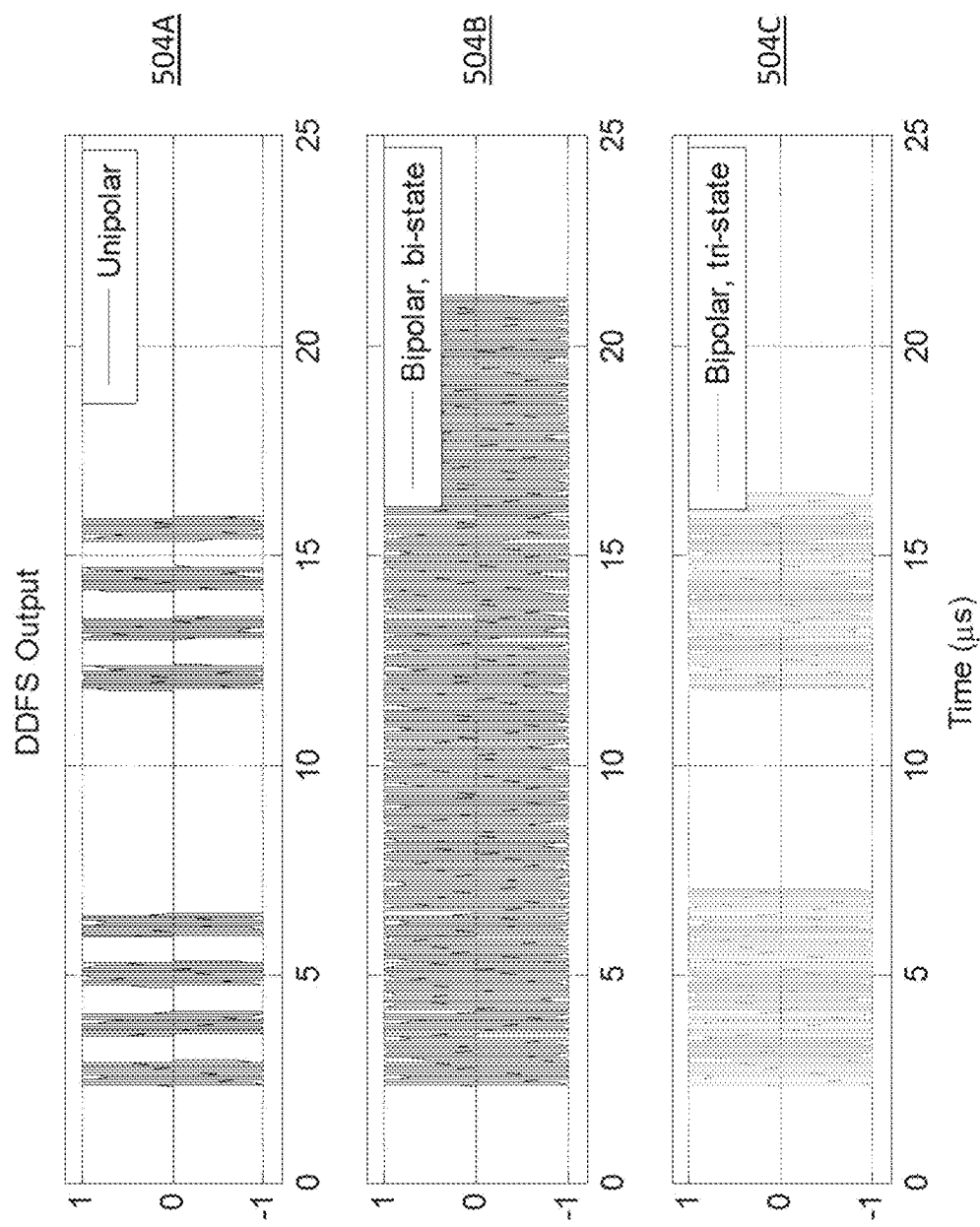
Figure 5C:
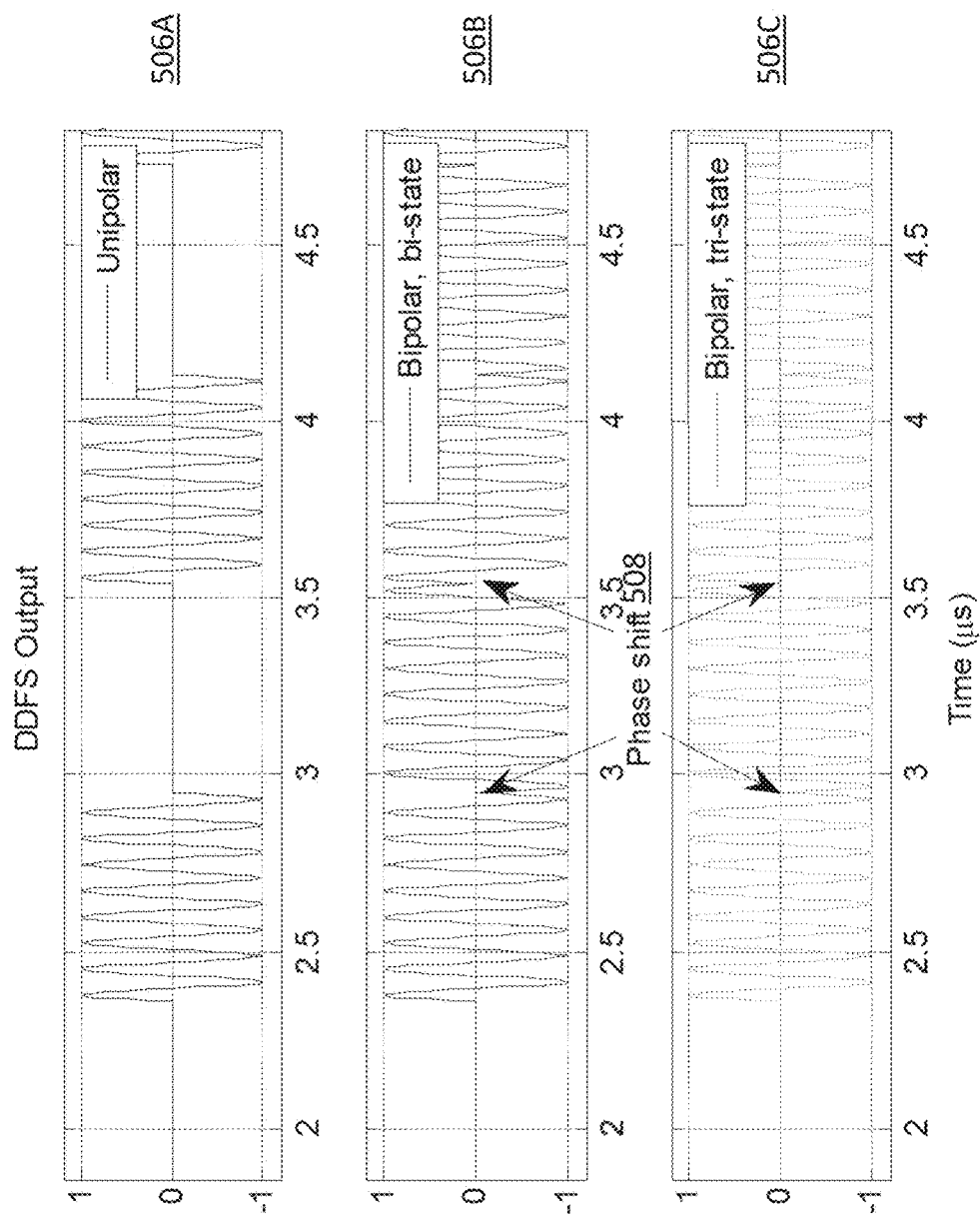

In various implementations, the system used for active modulation may be unipolar, in which a carrier is turned on or off for a logical one or zero; bipolar, in which a carrier is turned on for a logical one and phase inverted for a logical zero; or tri-state bipolar, similar to bipolar, but the carrier is turned off during a non-modulation period. Examples of such implementations are shown respectively in charts 502B-502D of FIG. 5A, in comparison to the logical values shown in chart 502A. In bipolar implementations, the modulation depth is doubled, resulting in a 3 dB gain. FIG. 5B is a similar chart showing a DDFS output in example implementations of unipolar modulation 504A, bi-polar bi-state modulation 504B, and bi-polar tri-state modulation 504C. FIG. 5C is a temporally expanded chart of a few logical values of the examples of FIG. 5B, illustrating phase shifts 508 between logical ones and zeros in bi-polar implementations 506B-506C, in comparison to unipolar implementation 506A.

As discussed above, in many implementations, the active tag may determine a reader's carrier frequency by monitoring and measuring between pauses or valleys of the signal during modulation. The tag may subtract a measured reader carrier from a pre-modulation period from a measured aggregate reader-plus-tag carrier during modulation to determine a tag carrier (e.g. Tag carrier (T)=aggregate carrier (A)−reader carrier (R)). The tag carrier may then be subtracted as a DC term during subsequent logical zero periods of valid subcarriers to obtain a non-modulated reader carrier for synchronization adjustment.

For bi-polar implementations, subtraction-based carrier tracking can still work by estimating a tag residual around zero crossing periods of the carrier. The transition around that period is faster than the estimation period at the bottom of a logical zero for unipolar ALM, and accordingly may produce a larger variance in estimations. Accordingly, in some implementations, an integration-based frequency tracking algorithm with data-dependent integration period detection may be used. Specifically, transmitted logical data using bipolar modulation are "symmetric" to zero, within each RSB, as well as during steady modulation. The active tag's carrier may be removed by integration over one or more subcarrier periods (e.g. 16 samples), resulting in a non-modulated reader carrier.

In one such implementation of integration-based tag-carrier removal, a constant predetermined frequency signal (e.g. 5 kHz) may be added to the reader carrier during non-tag modulated periods. In many implementations, as the phase of the aggregated carrier rotates at approximately 5 kHz over a subcarrier period, averaging the carrier over such periods results in approximately the non-modulated carrier.

In some implementations, specific subcarrier periods may be identified for integration to cancel out the tag carrier, depending on various inter-symbol interferences. A period may be selected responsive to a first half of the samples during the period being logical ones and a second half of the samples being logical zeroes (e.g. +1 and −1, or vice versa, in bipolar implementations). Accordingly, in such selected periods, the sum of all samples may be zero. Integration over one sub carrier duration may be defined as:

$$\sum_{n=0}^{N_{sc}-1} y[n] = \sum_{n=0}^{N_{sc}-1}\left(\sum_{k=0}^{N_{IR}-1} h[k] \times x[n-k]\right) = \sum_{k=0}^{N_{IR}-1} h[k]\left(\sum_{n=0}^{N_{sc}-1} x[n-k]\right) = 0$$

Accordingly, integration $\sum_{n=0}^{N_{sc}-1} y[n]$ equals the summation of each filter coefficient h[k] multiplied by the summation of past inputs $\sum_{n=0}^{N_{sc}-1} x[n-k]$. For arbitrary h[k], the above requirement is satisfied if:

$\sum_{n=0}^{N_{sc}-1} x[n-k]=0$ for $k=0,1,\ldots,N_{IR}-1$.

Once satisfied, $x[-l]=x[N_{sc}-l]$ for $l=1, 2, \ldots, N_{IR}$.

Described another way, in some implementations, a valid subcarrier period may be one in which the sum of any consecutive symbols, or ranges of symbols, equals zero: a sequence of "+1, −1, −1, +1" may be invalid, while a sequence of "+1, −1, +1, −1" may be considered valid. Such periods may be identified through the use of a sliding window algorithm or similar methods. In a further implementation, within each RSB, the first sample of modulated data may determine the entire subcarrier pattern; accordingly, in such implementations, only the first samples of subcarriers need be compared during any given window.

Figure 5D:
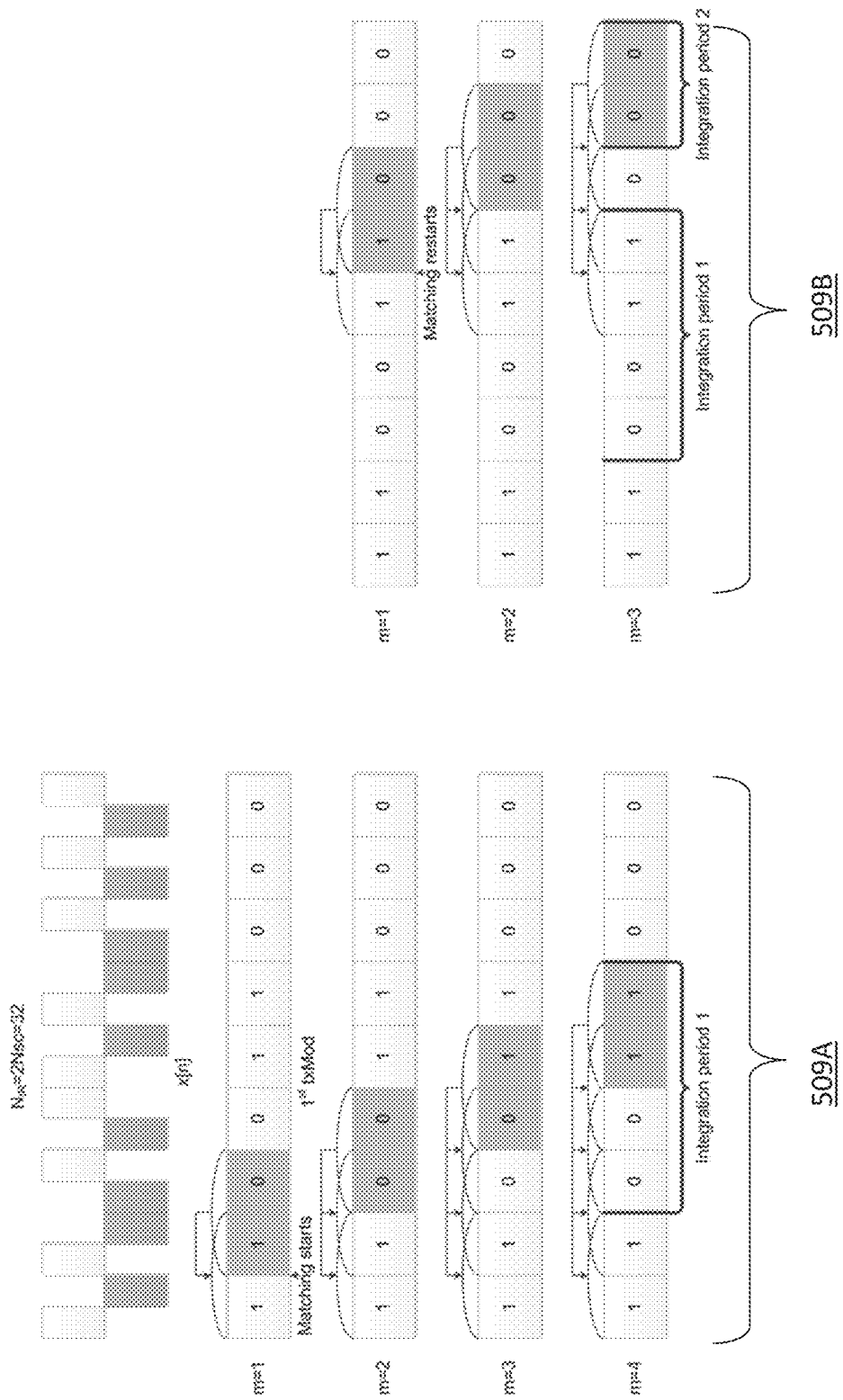
FIG. 5D is a diagram of an implementation of a method for period identification for integration-based carrier cancellation.

In one such implementation, a first modulated symbol m of the target period of M-subcarriers may be compared to those from M-subcarriers in the past, starting from m=1 and iteratively incrementing m. For each m, there are m such periods to compare. If any of the past M-subcarrier periods matches the target, then the end of that period to the end of the target period may be tested as a valid integration period. m may be reset to 1, and matching restarted for the period under test. If no past subcarrier periods match, then the target period may be advanced by one subcarrier (e.g. m=m+1). An example of this is illustrated in FIG. 5D. Given a target period of M=2, during a first iteration 509A, each pair of symbols may be compared to each pair of prior symbols in a sliding window, until identifying, at m=4, a first integration period. The window may be advanced and matching restarted in a second iteration 509B, until identifying a second integration period.

In some implementations, the txMod signal trigger may be identified just before the tag carriers are active, and at such times, not enough data for integration may be available. Accordingly, in one such implementation, the I/Q data for the reader signal may be stored for a number of subcarrier periods (e.g. up to $2^M$), allowing accumulation of data for integration.

Figure 5E:
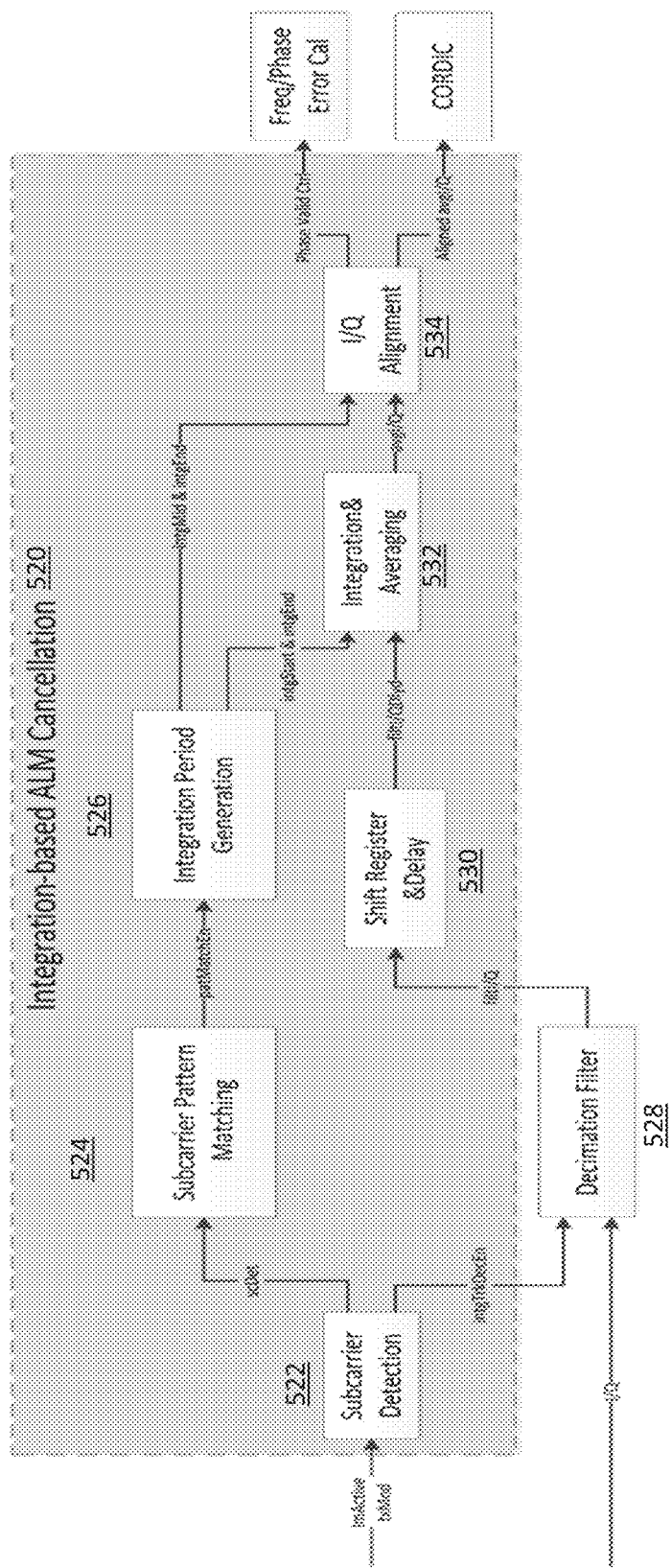
FIG. 5E is a block diagram of an implementation of a circuit for integration-based carrier cancellation.

FIG. 5E is a block diagram of an implementation of a circuit 520 for integration-based carrier cancellation. Responsive to an lmActive and/or txMod trigger, a subcarrier detection element 522 may detect a subcarrier and the number of samples within each subcarrier, depending on protocol implementation and communication rate. A subcarrier pattern matching element 524 may identify matching subcarrier patterns via an algorithm such as that discussed above in connection with FIG. 5D. Once a valid integration period is identified, at element 526, the period may be split into a start and end identification for integration and averaging, and a middle and end identification for alignment.

A decimation and filtering element 528, similar to element 310 discussed above, may provide I/Q data to a delay 530. Once an integration period is identified at element 526 as discussed above, the delayed signal may be accordingly integrated and averaged at element 532. The averaged I/Q signal may be re-aligned at element 534 based on the middle and end of the integration period to avoid phase relationship mismatches and provide phase valid control signals.

Accordingly, integration-based carrier suppression can provide phase adjustment for bipolar active load modulation, with more robustness in the face of low signal to noise ratios and noisy clock references. Such implementations may also mitigate noise associated with the non-modulated reader carrier, and be independent to varying mutual coupling as the tag or reader is moved and distance between the elements changes.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for carrier synchronization in near field communications, comprising:
 a first circuit configured to convert a first pair of signals representing Cartesian coordinates of an aggregated near field communication signal comprising a broadcast carrier from a remote device and a locally-generated carrier into a second pair of signals representing polar coordinates of the aggregated near field communication signal;
 a second circuit configured to identify and remove an offset from each of the second pair of signals to generate a third pair of signals; and
 a third circuit configured to convert the third pair of signals from a Cartesian to polar representation and provide an output phase angle of the polar representation of the third pair of signals to a frequency adjustment circuit of a local carrier generator.

2. The system of claim 1, further comprising the frequency adjustment circuit configured to adjust a frequency of the local carrier generator into synchronization with the broadcast carrier from the remote device.

3. The system of claim 2, wherein the frequency adjustment circuit comprises a charge pump.

4. The system of claim 2, wherein the frequency adjustment circuit comprises an array of dynamically switchable capacitors.

5. The system of claim 4, wherein the dynamically switchable capacitors have binary coded values.

6. The system of claim 4, wherein the dynamically switchable capacitors have unary coded values.

7. The system of claim 1, wherein the second circuit is configured to identify and remove the offset responsive to detection of a pause in transmission of modulated data by the system.

8. The system of claim 1, wherein the second circuit is configured to subtract an average amplitude rave of the second signals from the second signals to generate an envelope of the third pair of signals.

9. The system of claim 1, further comprising a selector configured to provide one of either of the output of the second circuit or the output of the third circuit to the frequency adjustment circuit, responsive to detection of presence or absence of modulated data, respectively.

10. The system of claim 1, wherein the first circuit further comprises a decimator.

11. The system of claim 1, further comprising a direct digital frequency synthesizer (DDFS) configured to receive the output of the second circuit, the DDFS configured to generate a phase correction signal based on the output of the second circuit.

12. A method for carrier synchronization in near field communications, comprising:
 receiving, by a first circuit of a first device, a near field communication signal comprising an aggregated broadcast carrier from a second device and a locally-generated carrier from the first device;
 converting, by a second circuit of the first device, a Cartesian representation of the aggregated broadcast carrier to a polar representation;
 removing, by a third circuit of the first device, an offset from the polar representation of the aggregated broadcast carrier to generate an intermediate signal;
 converting, by a fourth circuit of the first device, a Cartesian representation of the intermediate signal into a polar representation; and
 controlling a local carrier generator, by the first device, with an output phase signal of the polar representation of the intermediate signal from the fourth circuit.

13. The method of claim 12, further comprising identifying an absence of modulation of the locally-generated carrier with data.

14. The method of claim 13, wherein converting the Cartesian representation of the aggregated broadcast carrier to a polar representation is performed responsive to identifying the absence of modulation.

15. The method of claim 13, wherein identifying the absence of modulation of the local-generated carrier comprises identifying a modulation pause between packets.

16. The method of claim 12, wherein converting the Cartesian representation of the aggregated broadcast carrier to the polar representation comprises performing a coordinate rotation digital computer (CORDIC) calculation.

17. The method of claim 12, wherein removing the offset from the polar representation of the aggregated broadcast carrier to generate the intermediate signal comprises subtracting an average amplitude of the aggregated broadcast carrier from the aggregated broadcast carrier.

18. The method of claim 12, wherein removing the offset from the polar representation of the aggregated broadcast carrier to generate the intermediate signal comprises multiplying an average amplitude of the aggregated broadcast carrier by a sampled phase of the aggregated broadcast carrier.

19. A system for carrier synchronization in near field communications, comprising:
 an antenna for receiving a broadcast carrier from a remote device and transmitting a locally-generated carrier and modulated data; and
 a carrier synchronization circuit for synchronizing the locally-generated carrier and broadcast carrier based on an identified phase error from a double Cartesian-to-polar mapping of a combination of the locally-generated carrier and broadcast carrier.

20. The system of claim 19, further comprising a modulation suppression circuit for providing unmodulated carrier signals to the carrier synchronization circuit.

* * * * *